(12) United States Patent
Stana

(10) Patent No.: US 6,909,985 B2
(45) Date of Patent: Jun. 21, 2005

(54) METHOD AND APPARATUS FOR RECORDING CHANGES ASSOCIATED WITH ACCELERATION OF A STRUCTURE

(75) Inventor: James M. Stana, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/305,171

(22) Filed: Nov. 27, 2002

(65) Prior Publication Data

US 2004/0102918 A1 May 27, 2004

(51) Int. Cl.⁷ .............................................. G06F 15/00
(52) U.S. Cl. .................. 702/141; 340/539.19; 340/904; 600/507; 607/19
(58) Field of Search ............................. 702/127, 141, 702/142, 166; 73/448, 449, 491, 514.3, 651, 866.2; 340/539.19, 904; 360/77.08; 365/185.03; 607/17, 18, 19; 700/228; 701/29, 35; 600/507

(56) References Cited

U.S. PATENT DOCUMENTS

| | | |
|---|---|---|
| 4,387,587 A | 6/1983 | Faulconer |
| 4,745,564 A | 5/1988 | Tennes et al. |
| 4,862,394 A * | 8/1989 | Thompson et al. ......... 702/166 |
| 5,262,984 A | 11/1993 | Noguchi et al. |
| 5,289,377 A | 2/1994 | Yokote et al. |
| 5,412,986 A * | 5/1995 | Beringhause et al. ..... 73/514.33 |
| 5,446,659 A | 8/1995 | Yamawaki |
| 5,541,860 A | 7/1996 | Takei et al. |
| 5,576,491 A | 11/1996 | Bozeman, Jr. |
| 5,593,431 A * | 1/1997 | Sheldon ....................... 607/19 |
| 5,610,337 A | 3/1997 | Nelson |
| 5,627,753 A | 5/1997 | Brankin et al. |
| RE36,200 E | 4/1999 | Berrian et al. |
| 6,208,247 B1 * | 3/2001 | Agre et al. ............ 340/539.19 |
| 6,525,672 B2 * | 2/2003 | Chainer et al. ............ 340/904 |
| 6,605,046 B1 * | 8/2003 | Del Mar ..................... 600/507 |

FOREIGN PATENT DOCUMENTS

| | | |
|---|---|---|
| DE | 4103599 | 8/1992 |

\* cited by examiner

*Primary Examiner*—John Barlow
*Assistant Examiner*—John Le
(74) *Attorney, Agent, or Firm*—Burns, Doane, Swecker & Mathis, L.L.P.

(57) ABSTRACT

The present invention is directed to recording changes associated with the acceleration of a structure. An exemplary embodiment includes an accelerometer array having at least one silicon beam type accelerometer, a nonvolatile memory, a clock timer, a programmable control unit operatively coupled to the accelerometer array, at least one non-volatile memory, and clock timer. The accelerometer array, the at least one non-volatile memory, the clock timer and the programmable control unit can be formed on a common semiconductor substrate (e.g., integrated), with the accelerometer array disposed in a central region.

50 Claims, 5 Drawing Sheets

METHOD AND APPARATUS FOR RECORDING CHANGES ASSOCIATED WITH ACCELERATION OF A STRUCTURE

BACKGROUND OF THE INVENTION

1. Field of the Invention

This invention relates in general to the field of electronic instrumentation, such as accelerometers.

2. Background Information

Dynamic events of engineering interest include vibration, acceleration, energy dissipation and so forth. For example, dynamic events are associated with the structure of an object in motion subjected to an external force. Dynamic events can be short term in nature, as with energy dissipation within the frame and body of a vehicle involved in a crash test, or in the wing of an aircraft or missile during a particular maneuver.

Capturing dynamic events using equipment such as accelerometers, allocated signal conditioners, amplifiers and recorders, involves modifying the structure of interest to accommodate the equipment. For example, wires can be run between the various components, and power supplied. These modifications can impact the function and operation of the structure of interest. For example, the amount of equipment placed in the device can impact the operation of the equipment due to its location. The installation and removal of the equipment can be time consuming and labor intensive. The instrumentation weight can impact the host structure and subsequent performance during high-G maneuvers.

U.S. Pat. No. 4,745,564 (Tennes) describes a device containing an accelerometer, power supply and memory packaged as produced to measure the acceleration histories of commodities when they are being handled or transported. The device monitors three different coordinate axes, and records accelerations which exceed a limit by the greatest magnitude, and their time of the occurrence.

U.S. Pat. No. Re. 36,200 (Berrian) describes a device for monitoring an externally applied parameter to a selected products. The device includes a housing enclosing a sensor, a monitoring and output network. The monitoring and output network is an integrated circuit, a memory device and an arrangement of LEDs.

U.S. Pat. No. 5,446,659 (Yamawaki) describes a device for recording traffic accident data using an acceleration sensor, angular velocity sensor, memory and a control section. For example, the device records the acceleration and angular velocity of an automobile for a time interval after the detection of an acceleration which exceeds angular velocity threshold.

U.S. Pat. No. 5,610,337 (Nelson) describes measuring the amplitude and frequency of an acceleration using a digital accelerometer manufactured from arrays of micro-mechanical sensing elements designed to detect acceleration in a particular rotational or transitional direction. The sensing elements have size and mass parameters that can be adjusted to vary their frequency response and sensitivity to amplitude of acceleration.

SUMMARY OF THE INVENTION

Exemplary embodiments of the present invention are directed to an apparatus for recording changes associated with acceleration of a structure, comprising an accelerometer array having at least one silicon beam type accelerometer, a nonvolatile memory, a clock timer, and a programmable control unit operatively coupled to the accelerometer array, non-volatile memory, and clock timer, where the accelerometer array, the non-volatile memory, the clock timer and the programmable control unit are formed on a common semiconductor substrate with the accelerometer array disposed in a central region of the substrate.

Exemplary embodiments are also directed to an apparatus for recording changes associated with acceleration of a structure comprising means for sensing acceleration; means for storing data; means for measuring temporal data associated with acceleration data; and means operatively coupled to the sensing means, storing means and measuring means for triggering the storing means to record acceleration data and temporal data in response to a predetermined event, wherein the sensing means, storing means and measuring mens are formed on a common semiconductor substrate with the sensing means disposed in a central region.

The present invention also relates to exemplary methods for recording changes associated with the acceleration of a structure using at least one accelerometer, non-volatile memory, clock timer, and programmable control unit integrated on a common substrate, the method comprising: detecting a predetermined event; monitoring temporal data from the clock timer correlated with the acceleration data; and triggering the non-volatile memory with the programmable control unit to record in the non-volatile memory acceleration data from the accelerometer and the temporal data.

BRIEF DESCRIPTION OF THE DRAWINGS

Other advantages of the present invention will become apparent to those skilled in the art upon reading the following detailed description of example embodiments, in conjunction with the accompanying drawings, wherein like reference numerals have been used to designate like elements, and wherein.

DETAILED DESCRIPTION OF THE PREFERRED EMBODIMENTS

Figure 1:
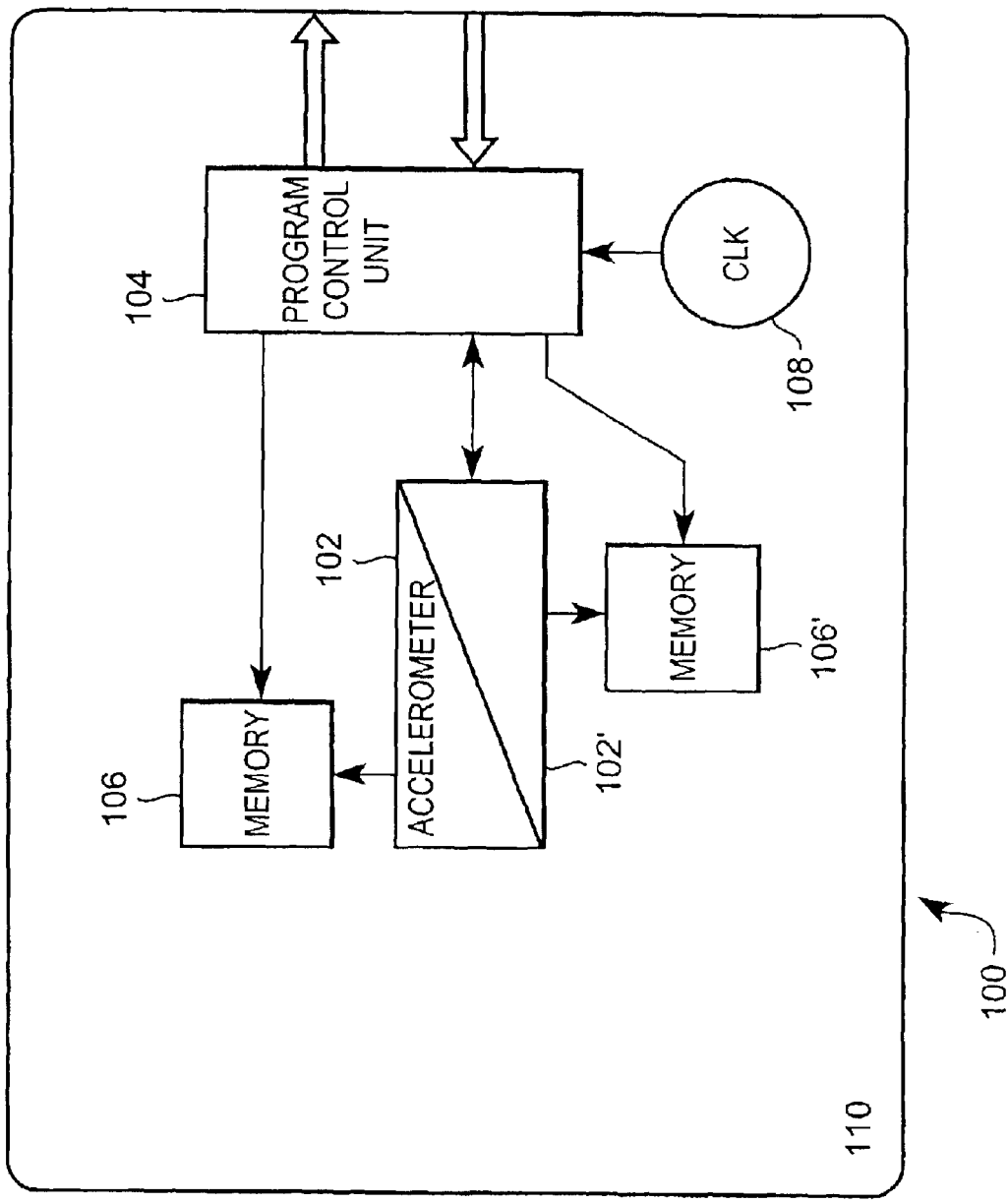
FIG. 1 shows a functional block diagram according to an exemplary embodiment of the present invention.

FIG. 1 shows a block diagram of an exemplary functional block diagram of an apparatus and associated method for recording changes associated with the acceleration of a structure. In FIG. 1, an exemplary apparatus is represented as a programmable accelerometer with an integrated data logger (PADL) 100, for recording changes associated with acceleration of the structure.

In the exemplary embodiments described herein, components that are operatively coupled interact either electrically, mechanically, optically or through some other type of physical coupling. The PADL system 100 includes means for sensing acceleration, represented as at least one silicon accelerometer. The accelerometer is illustrated as a silicon accelerometer array for sensing and measuring an acceleration event 102. The PADL system also includes means for storing data, represented as any non-volatile memory 106 including, but not limited to volatile memories with even short term battery back-ups. A means for measuring temporal data associated with acceleration data is represented as a clock timer 108.

A triggering means is represented as any computer and/or processing device. In FIG. 1, a programmable control unit 104 is provided that is operatively coupled to the at least one silicon accelerometer 102, non-volatile memory 106, and clock timer 108. The silicon accelerometer, the non-volatile memory, the clock timer and the programmable control unit can be formed on a common semiconductor substrate 110 (as in the case of an integrated circuit), with the accelerometer array disposed in a central region (that is, a region which includes a center of gravity of the apparatus and/or a geometrical center of the apparatus) the center of the substrate. Programmable control unit 104 triggers nonvolatile memory 106 which records acceleration data and temporal data in response to a predetermined event.

As shown in FIG. 1, the accelerometer array 102 and the non-volatile memory 106 are disposed adjacent (e.g., in immediate and direct proximity) to each other on the common semiconductor substrate 110. This minimizes the area of the device and thus the mass, allowing the device to fit into tight spaces and not affect the structure being measured.

The PADL apparatus, being self contained and formed on a common substrate, allows for a physically small package. For example, the PADL can be formed 1–2 centimeters in diameter (or smaller or larger), and can weigh a few ounces (or less or more), although any size and weight can be accommodated. A smaller size can provide enhanced flexibility in the attachment and implementation of the PADL system. The PADL can be fastened to a structure of interest by an attachment means, such as peel and stick adhesive, glue or other fastener. The sensor package can be oriented along one or more axis of interest and records the acceleration forces acting on the structure of interest along the axis of interest. By placing the accelerometer array in the center region of the sensor package, effects of noise, a product of secondary motion, acceleration and vibration, or flex of the substrate itself, can be minimized. This can improve the sensor package's ability to accurately measure and record the acceleration of the structure of interest.

In response to a predetermined event, the programmable control unit 104, triggers the non-volatile memory 106, coupled to the clock timer 108 and accelerometer array 102, to record the temporal data from clock timer 108 and acceleration data from the accelerometer 102 in the non-volatile memory 106. The predetermined event can be the detection of a predetermined level or duration of acceleration in one or more axis, the reception of an electronic signal from a device or program within the PADL, from a remote device, or at a predetermined time.

The PADL apparatus 100 has been described to include at least one silicon accelerometer 102 for sensing and measuring an acceleration event. However, in an alternate exemplary embodiment, the PADL device 100 can employ an array of any number of silicon accelerometers.

Figure 2:
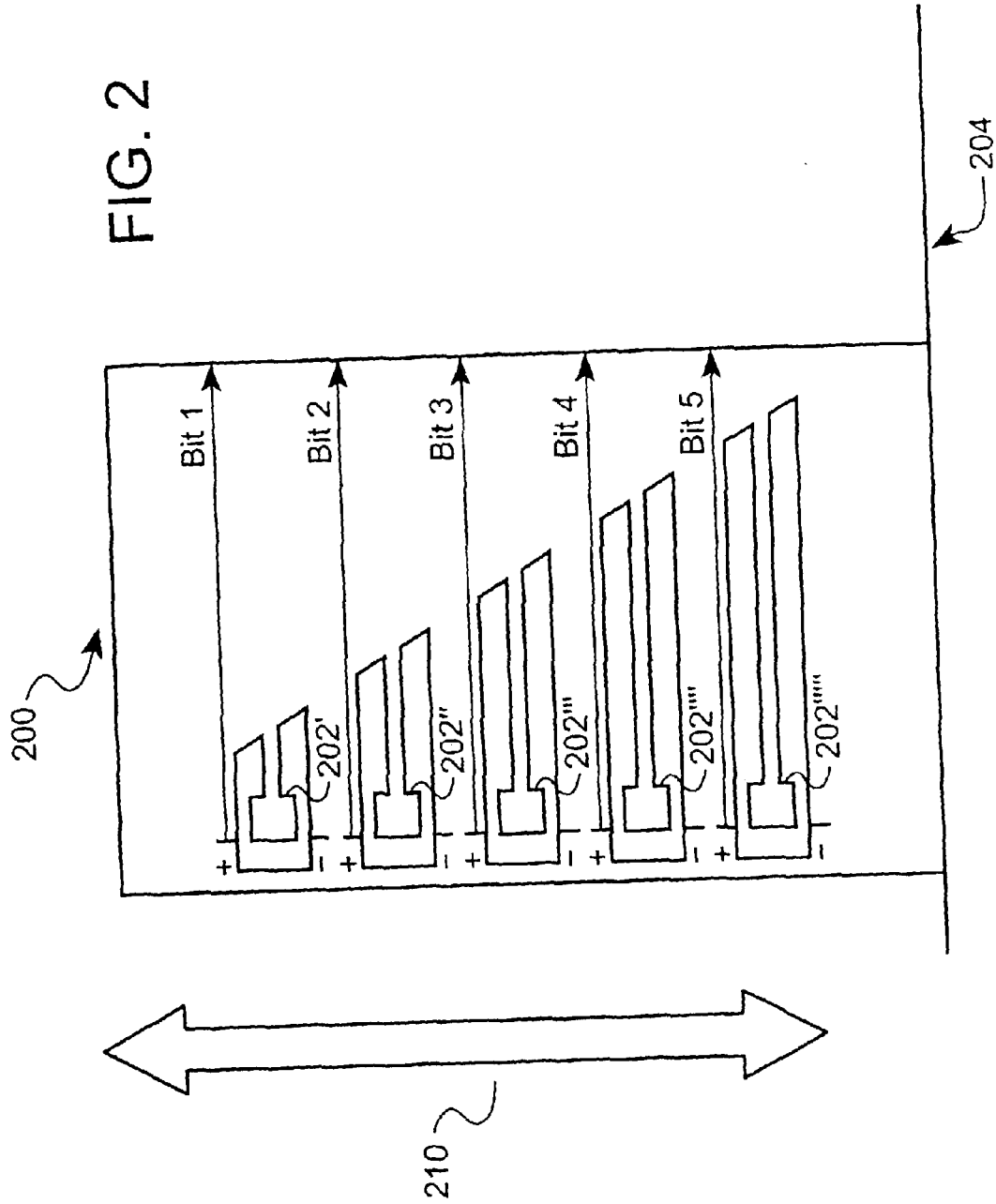
FIG. 2 shows an array of silicon beam type accelerometers which are configured to measure acceleration along a single axis according to an exemplary embodiment.

Referring to FIG. 2, the exemplary accelerometer array 200 comprises a plurality of silicon accelerometers 202 disposed along at least one predetermined axis 210, where each accelerometer 202 is configured to generate a signal at a predetermined level of acceleration along a predetermined axis 210. The accelerators can be formed on a common substrate using any suitable integrated circuit process, and mounted to a surface 204 of the structure being monitored. Each accelerometer 202 can be configured within the array to indicate an acceleration level at a predetermined magnitude greater than the adjacent accelerometer along the same axis 210.

In the FIG. 2 example, accelerometer array 200 includes a first silicon beam type accelerometer 202' and a second silicon beam type accelerometer 202". The first silicon beam type accelerometer 202' can be adapted to generate a signal at a first magnitude of acceleration along the predetermined axis 210, and the second silicon beam type accelerometer 202" can be adapted to generate a signal at a magnitude of acceleration along the same axis 210 having a predetermined numerical relationship to the first predetermined level of acceleration.

For example, accelerometer 202' can be configured so that its acceleration threshold along axis 210 is 1G. Upon detection of an acceleration event surpassing +/−1G along axis 210 accelerometer 202' provides a signal denoting a +/−1G acceleration measurement. Similarly, accelerometer 202" can be configured so that its acceleration threshold along axis 210 is 1G greater in magnitude than that of accelerometer 202' (e.g., +/−2G). Accelerometer 202''', can be configured to an acceleration threshold of +/−3G, and so forth. Of course, any desired characteristics can be selected for each of the accelerometers in the array, and the threshold spacings between accelerometers can be varied. For example, 1G spacing can be used between the first two accelerometers and 1.5G spacing can be used between the next two adjacent accelerometers.

In an exemplary operation, upon the structure being subjected to a 2G acceleration event along axis 210, a 2G acceleration would be at or beyond the threshold of accelerometers 202" and 202''' in array 102. Thus accelerometers 202" and 202''' would trigger, while accelerometer 202', having a 3G threshold, would remain inactive. By monitoring the particular accelerometers in the array which are affected by an acceleration event, very accurate acceleration measurements can be obtained. While this example uses 3 accelerometers with 1G spacing, arrays featuring large numbers of silicon beam type accelerometers 202 can be used. These accelerometers can have thresholds spaced at less than or greater than 1G. Each silicon beam type accelerometer in an array can be assigned a particular bit value. As each accelerometer generates a signal, information associated with this signal (e.g., a 1 bit representation that a particular accelerometer was triggered) can be recorded in a non-volatile memory.

Through the use of a plurality of silicon accelerometers disposed along a predetermined axis 210, with each accelerometer 202 configured to indicate an acceleration level at a predetermined amount above the previous accelerometer along the same predetermined axis 210, PADL can accurately measure and record high acceleration readings along an axis of interest with high reliability. For example, peak values about a particular level, or acceleration events at specified time intervals can be captured and memory, and optionally displayed in any desired format.

The PADL system is not limited to sensing and measuring acceleration data along a single axis. By using arrays disposed to sense and measure acceleration data along a plurality of axis, a single PADL device can monitor several axis of acceleration. In an exemplary embodiment, data for each axis of acceleration can be recorded in a separate non-volatile memory.

In another exemplary embodiment, the accelerometer array 102 can comprise a plurality of accelerometers represented as groups of accelerometers 102, 102'. Each group of accelerometers can be configured to detect and measure acceleration along a particular axis of acceleration of any desired orientation. Each group of accelerometers can be operatively coupled to a non-volatile memory 106, 106' through the control unit 104, wherein upon the detection of a predetermined event, acceleration data for each particular axis of acceleration along each of the plurality of predetermined axis can be recorded in a non-volatile memory 106, 106'.

Figure 3:
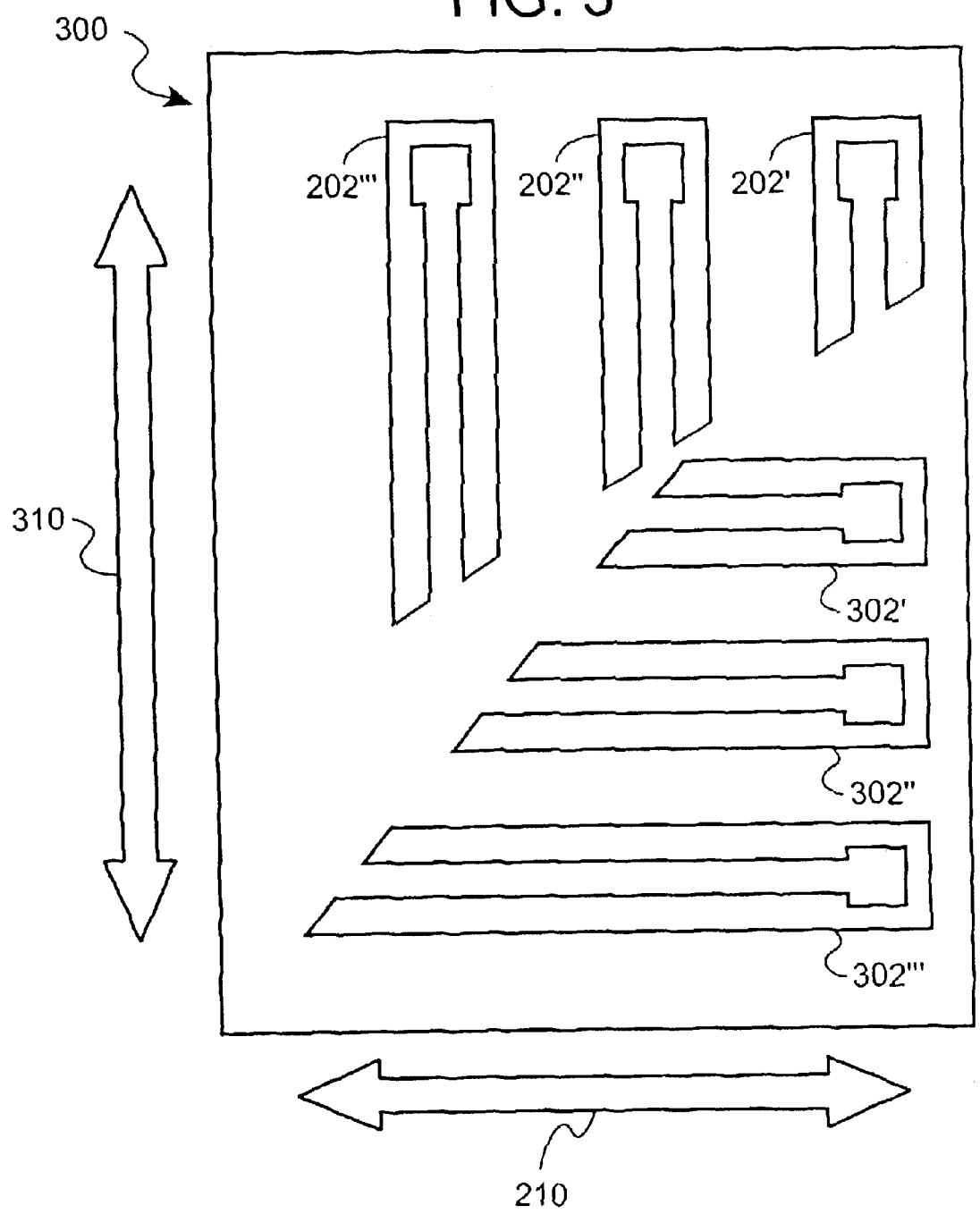
FIG. 3 shows an array of silicon beam type accelerometers which are configured to measure acceleration along two axes according to an exemplary embodiment.

FIG. 3 shows an array of silicon beam type accelerometers 300 having groups of accelerometers, 202, 302 configured to measure acceleration along two predetermined axes 210, 310. In this embodiment, array 300 includes a plurality of silicon beam type accelerometers 202, 302, disposed along two predetermined axes 210 310, wherein each accelerometer 202, 302 within each group is configured to generate a signal at a predetermined level of acceleration along one of the two predetermined axis 210, 310. In addition to the configuration of accelerometers along axis 210, where the threshold of accelerometer 202' is a predetermined magnitude greater (or lesser) than that of adjacent accelerometer 202", which is a predetermined magnitude greater (or lesser) than that of accelerometer 202''', accelerometers 302 are disposed along axis 310. Accelerometers 302 likewise can each be configured to generate signals at a predetermined acceleration magnitude along the 310 axis, each of which differ in magnitude by a predetermined amount (e.g., a fixed or variable amount).

For example, the threshold for accelerometer 302' can differ from the threshold of accelerometer 302" by a magnitude of +/−1G, which can differ from the threshold of accelerometer 302''' by +/−1G and so forth.

The use of plural of silicon accelerometers disposed along two predetermined axes 210, 310 with each accelerometer configured to indicate an acceleration level at a predetermined amount different from the previous accelerometer along the same predetermined axis allows the PADL to measure and record very high acceleration readings along two or more axes of interest with great precision. Of course, any number of silicon beam type accelerometer arrays can be employed along any number of axes.

Figure 4:
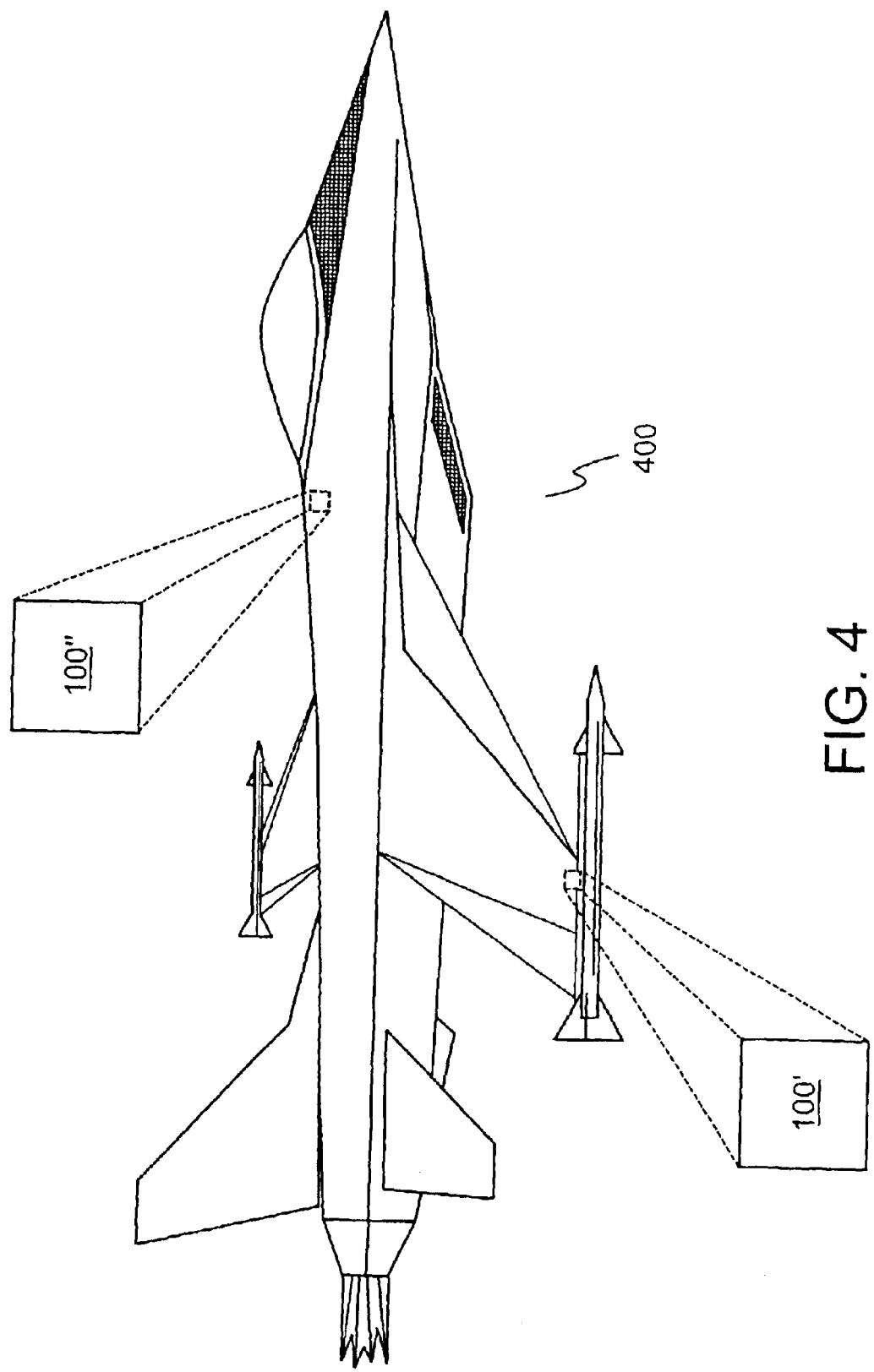
FIG. 4 shows an exemplary deployment of multiple programmable accelerometer with integrated data logger (PADL) systems on an aircraft structure.

FIG. 4 shows an example of the deployment of multiple PADL systems on an aircraft structure. The PADL's small physical size allows flexibility in the method of the deployment of the sensor package. Once installed, a method for recording changes associated with the acceleration of a structure can be performed.

Aircraft 400, can have multiple PADL devices affixed to particular structure of interest on the aircraft. In the illustrated example, a PADL device 100' is attached to the aircraft wing and a second PADL device 100" is contained within the aircraft's fuselage. Each is disposed to monitor and record acceleration forces acting on the structure to which it is attached along one or more predetermined axes. Each PADL package 100 can be a self-contained unit including its own battery power supply or in the alternative the PADL can receive power from the aircraft's power systems.

Figure 5:
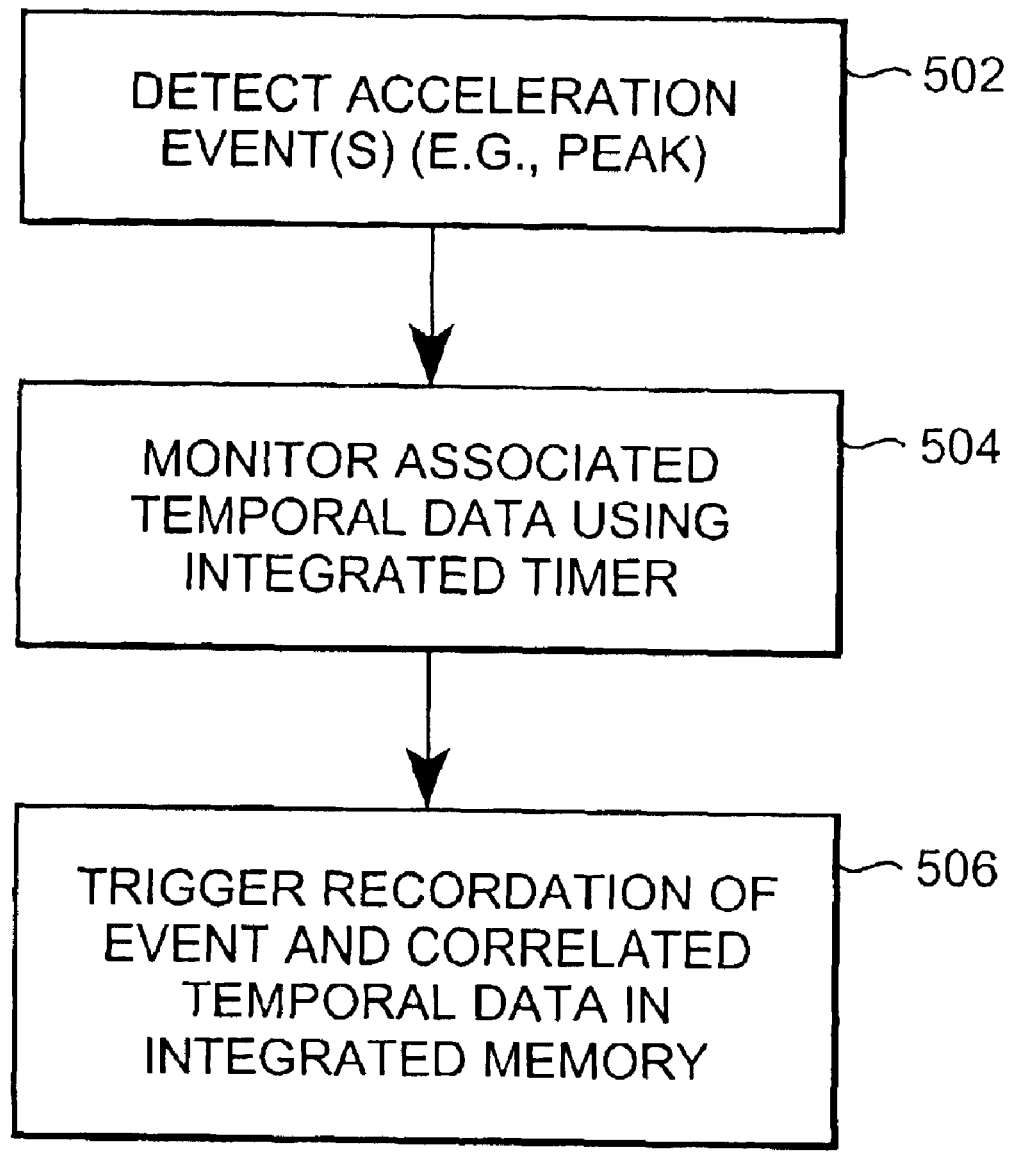
FIG. 5 shows an exemplary method of detecting and recording changes associated with acceleration of a structure.

An exemplary method can be implemented under control of the control unit 104 programmed to perform operations as illustrated in the exemplary FIG. 5 flow chart 500. FIG. 5 illustrates a first step 502 of detecting a predetermined event. For example, the event corresponds to a comparison of acceleration data with one or more thresholds, and determining that a given threshold has been exceeded. A second step 504 involves monitoring temporal data using the integrated clock timer. In a third step 506, the non-volatile memory is triggered to record the event(s). For example, the acceleration data from at least one silicon accelerometer can be recorded in the non-volatile memory, with temporal data from the clock timer being correlated with the acceleration data.

Referring again to FIG. 1, the PADL device 100 includes nonvolatile memory 106. The nonvolatile memory 106 is coupled to accelerometer array 102 and clock timer 108 via programmable control unit 104. Upon the detection of a predetermined event, for example a 2G climbing maneuver representing a peak acceleration threshold, the programmable control unit 104 triggers the nonvolatile memory 106 causing the acceleration data from the accelerometer array 102, and temporal data associated with the acceleration event measured by the integrated clock timer 108 to be recorded in the integrated nonvolatile memory 106. The temporal data, associated with the acceleration event, recorded by nonvolatile memory 106 can be the chronological time or times of an acceleration event, and/or the duration of the acceleration events, or any other temporal data associated therewith. For example, any fixed and/or variable time intervals can be used to record acceleration and/or temporal data.

The programmable control unit 104 allows the PADL system flexibility in operation and implementation. A user can choose the predetermined event which causes the programmable control unit to trigger the data collection and the type of data collected. In an exemplary embodiment the PADL system operates in a data collection mode in which the programmable control unit monitors the accelerometer and triggers the non-volatile memory and clock timer, recording time and acceleration data in the non-volatile memory upon the detection of a predetermined acceleration level along one or more axes. For example, the acceleration data can be measured at fixed and/or variable intervals and/or can be continuously measured. The acceleration data can be compared to one or more thresholds, and upon satisfying the threshold(s) (e.g., exceeding or falling below the threshold), the acceleration data and/or associated time data can be recorded.

Programmable control unit 104 can optionally be configured to include means for externally triggering the at least one accelerometer 102. For example, a pair of external pins for an external trigger such as a switch or a wireless link can be used, or any other trigger control. Thus, the predetermined event can be the programmable control unit receiving a signal from an external source.

The control unit 104 can also include means for linking with an external device to receive programming data or to download recorded data to the external device. As such the programmable control unit 104 can permit the PADL system to operate in various programmable modes of data collection (e.g., test mode and/or normal operation mode).

Upon completion of a test cycle, each PADL device can be coupled to an external device, such as a personal computer, and the collected acceleration and temporal data can be downloaded to the computer. New programming parameters can be uploaded to the programmable control unit from the computer. Another embodiment allows the PADL to receive new programming parameters from an external device in a dynamic environment.

Thus, the PADL can operate in a data collection mode in which the programmable control unit 104 monitors the accelerometer 102 and triggers the non-volatile memory 106 and clock timer 108, recording time and acceleration data in the non-volatile memory upon the detection of an acceleration event satisfying (e.g., exceeding) a predetermined acceleration level (e.g., threshold along one or more axes) and/or with a predetermined time interval.

The PADL can alternately, or in addition, operate in a data collection mode in which the programmable control unit 104 monitors the accelerometer 102 and triggers the non-volatile memory 106 and clock timer 108, recording time and acceleration data in the non-volatile memory at a predetermined time delay after the detection of an acceleration event at or exceeding a predetermined acceleration level along one or more axes as discussed previously.

The PADL can also operate in a continuous data collection mode. In this mode the programmable control unit, accelerometers, non-volatile memory, and clock timer, operate in a continuous collection mode, the non-volatile memory overwriting previously collected data wherein the device can retain the time and acceleration data regarding (e.g., surrounding, within a predetermined interval) a predetermined event.

Alternately, or in addition, the PADL can operate in a data collection mode in which the programmable control unit monitors the clock timer and triggers the non-volatile memory, recording time and acceleration data along one or more axes of acceleration in the non-volatile memory at a predetermined time.

In a peak data collection mode, the programmable control unit, accelerometers, non-volatile memory, and clock timer, can operate in a continuous collection mode, the non-volatile memory retaining only certain peak acceleration and associated temporal data regarding at least one of a predetermined event and/or time periods.

In yet another example embodiment, the PADL can include a data collection mode in which the programmable control unit monitors the clock timer and triggers the non-volatile memory, recording time and acceleration data along one or more axes of acceleration in the non-volatile memory, at an adjustable rate.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for recording changes associated with acceleration of a structure, the apparatus comprising:
   an accelerometer array having at least one silicon beam type accelerometer;
   non-volatile memory;
   a clock timer; and
   a programmable control unit operatively coupled to the accelerometer array, at least one non-volatile memory, and clock timer, wherein the accelerometer array, the at least one non-volatile memory, the clock timer and the programmable control unit are formed as an integrated circuit on a common semiconductor substrate with the accelerometer array provided in a center of the common semiconductor substrate, and wherein the non-volatile memory stores acceleration data related to changes associated with acceleration of the structure along with correlated time data.

2. The apparatus of claim 1 wherein the accelerometer array and the non-volatile memory are disposed adjacent to each other on the common semiconductor substrate.

3. The apparatus of claim 2 further comprising an internal power supply.

4. The apparatus of claim 1, further comprising an adhesive mount.

5. The apparatus of claim 1, wherein the substrate center is the geometric center of the substrate.

6. The apparatus of claim 1, wherein the substrate center is the center of gravity of the substrate.

7. Apparatus for recording changes associated with acceleration of a structure, the apparatus comprising:
   means for sensing acceleration;
   means for storing data;
   means for measuring temporal data associated with acceleration data; and
   means operatively coupled to the sensing means, storing means and measuring means for triggering the storing means to record acceleration data and associated temporal data as non-volatile data in response to a predetermined event, wherein the sensing means, storing means and measuring means are formed as an integrated circuit on a common semiconductor substrate with the sensing means provided in a center of the common substrate.

8. The apparatus of claim 7 wherein the sensing means and the storing means are disposed adjacent to each other on the common semiconductor substrate.

9. The apparatus of claim 7 wherein the sensing means comprises a plurality of silicon accelerometers disposed along at least one predetermined axis, wherein each accelerometer is configured to generate a signal at a predetermined level of acceleration along a predetermined axis.

10. The apparatus of claim 9 wherein the plurality of silicon accelerometers comprise groups of accelerometers, each group of accelerometers being configured to detect acceleration along a particular of axis of acceleration, and each group of accelerometers being operatively coupled to a non-volatile memory through the triggering means, wherein upon the detection of a predetermined event, acceleration data for each particular axis of acceleration along each of the plurality of predetermined axis is recorded in a non-volatile memory.

11. The apparatus of claim 7 wherein the sensing means comprises a first silicon beam type accelerometer and a second silicon beam type accelerometer, the first silicon beam type accelerometer being adapted to generate a signal at a first level of acceleration along the predetermined axis, and the second silicon beam type accelerometer is adapted to generate a signal at a level of acceleration along the same axis having a predetermined numerical relationship to the first predetermined level of acceleration.

12. The apparatus of claim 11 wherein the triggering means monitors the accelerometers along the at least one predetermined axis and triggers the storing means and measuring means to record time and acceleration data upon the detection of a pre-determined level of acceleration.

13. The apparatus of claim 7 comprising a plurality of accelerometer arrays.

14. The apparatus of claim 7 wherein the triggering means, comprises means for externally triggering the sensing means.

15. The apparatus of claim 7 wherein the triggering means comprises means for interfacing with an external device.

16. The apparatus of claim 7 comprising an internal power supply.

17. The apparatus of claim 11 wherein the triggering means, sensing means, storing means and measuring means operate in a continuous collection mode, the storing means overwriting previously collected data to retain time and acceleration data regarding a predetermined event.

18. The apparatus of claim 7 comprising means for attaching the apparatus to the structure.

19. The apparatus of claim 7, further comprising means for adhesively mounting the apparatus to a structure.

20. The apparatus of claim 7, wherein the substrate center is the geometric center of the substrate.

21. The apparatus of claim 20, wherein the substrate center is the geometric center of the substrate.

22. The apparatus of claim 20, wherein the substrate center is the center of gravity of the substrate.

23. The apparatus of claim 7, wherein the substrate center is the center of gravity of the substrate.

24. A method for recording changes associated with the acceleration of a structure using at least one accelerometer, non-volatile memory, clock timer, and programmable control unit integrated on a common semiconductor substrate with the accelerometer provided in a center of the semiconductor substrate, the method comprising:
   detecting a predetermined event;
   monitoring temporal data from the clock timer correlated with acceleration data from the accelerometer; and
   triggering the non-volatile memory with the programmable control unit to record in the non-volatile memory acceleration data from the accelerometer and the temporal data.

25. The method of claim 24 wherein the predetermined event is the receipt of a signal from an external trigger.

26. The method of claim 24 wherein the programmable control unit monitors the accelerometer and triggers the non-volatile memory and clock timer, upon the detection of a predetermined acceleration level.

27. The method of claim 24 wherein the programmable control unit, accelerometer, clock timer and non-volatile memory, operate in a continuous collection mode overwriting previously recorded time and acceleration data, to retain time and acceleration data regarding a predetermined event.

28. The method of claim 24 wherein the programmable control unit triggers the non-volatile memory and accelerometer upon detection of an acceleration event lasting a predetermined duration.

29. The method of claim 24, comprising:
   comparing acceleration data to a threshold; and
   recording acceleration data which satisfies the threshold.

30. The method of claim 24, comprising:
   recording the acceleration data of variable time intervals.

31. The apparatus of claim 24, wherein the substrate center is the geometric center of the substrate.

32. The apparatus of claim 24, wherein the substrate center is the center of gravity of the substrate.

33. A method for recording changes associated with the acceleration of a structure using at least one accelerometer, non-volatile memory, clock timer, and programmable control unit integrated on a common semiconductor substrate, the method comprising:
   detecting a predetermined event;
   monitoring temporal data from the clock timer correlated with acceleration data from the accelerometer;
   triggering the non-volatile memory with the programmable control unit to record in the non-volatile memory acceleration data from the accelerometer and the temporal data; and
   determining peak acceleration data associated with at least one of a predetermined event and time period.

34. Apparatus for recording an acceleration of a structure, the apparatus comprising:
   an accelerometer;
   non-volatile memory;
   a clock timer; and
   a programmable control unit operatively coupled to the accelerometer, the non-volatile memory and clock timer, wherein the accelerometer, the non-volatile memory, the clock timer, and the programmable control unit are integrated on a common semiconductor substrate, and wherein the programmable control unit is operable to determine and store in the non-volatile memory peak acceleration data associated with at least one of a predetermined event and time period.

35. The apparatus of claim 34, wherein the accelerometer comprises arrays of silicon beams, each array being arranged along a respective axis.

36. The apparatus of claim 34, wherein with the accelerometer formed in a center of the semiconductor substrate.

37. Apparatus for attachment to a rigid structure to record acceleration and corresponding time data associated with the structure, comprising:
   a self-contained package containing a semiconductor substrate, said substrate having integrated thereon:
      an accelerometer for sensing acceleration of the rigid body along at least one axis;
      a clock for providing a time data clocked at a predetermined rate;
      non-volatile memory; and
      a programmable control unit for triggering recording in the non-volatile memory at least one amount of the sensed acceleration along with associated time data according to the rate provided by the clock; and
   means provided on the self-contained package for adhering the package to the rigid structure.

38. The apparatus of claim 37, wherein the package further comprises means for receiving programming instructions and for outputting the recorded data.

39. The apparatus of claim 37, wherein the adhering means comprises a peel and stick type adhesive.

40. The apparatus of claim 37, wherein recorded temporal data comprises chronological time.

41. The apparatus of claim 37, wherein recorded temporal data comprises time instances associated with at least one acceleration event.

42. The apparatus of claim 41, wherein recorded temporal data comprises times of the duration of a recorded acceleration event.

43. The apparatus of claim 37, wherein when sensed acceleration meets or exceeds a predetermined threshold amount, the programmable control unit triggers recording in the non-volatile memory each acceleration event meeting or exceeding said threshold amount and associated temporal data.

44. The apparatus of claim 37, wherein the programmable control unit is programmable to trigger recording of sensed acceleration and associated temporal data at a predetermined time.

45. The apparatus of claim 37, wherein triggering by the programmable control unit is controlled by means external to the package.

46. The apparatus of claim 37, wherein the accelerometer and the non-volatile memory are provided in direct proximity to each other on the common semiconductor substrate, with the accelerometer being provided in the substrate center.

47. The apparatus of claim 37, wherein the accelerometer comprises an array of silicon beams along at least one direction corresponding to an axis of acceleration.

48. The apparatus of claim 47, wherein each beam in an array of silicon beams along at least one direction corresponds to a one bit representation of acceleration along the corresponding axis of acceleration.

49. The apparatus of claim 37, wherein the non-volatile memory comprises at least first and second separate non-volatile memories, and acceleration sensed along two different axis are recorded in the first and second memories, respectively.

50. The apparatus of claim 37, wherein the accelerometer includes means for sensing acceleration along more than one axis and different acceleration threshold amounts are associated with the axes to cause triggering of recording by the programmable control unit.

* * * * *

UNITED STATES PATENT AND TRADEMARK OFFICE
CERTIFICATE OF CORRECTION

PATENT NO. : 6,909,985 B2
DATED : June 21, 2005
INVENTOR(S) : James M. Stana

It is certified that error appears in the above-identified patent and that said Letters Patent is hereby corrected as shown below:

Column 8,
Line 40, "a particular of axis" should read -- a particular axis --;
Line 64, "means, comprises" should read -- means comprises --; and Column 10,
Lines 23-24, "wherein with the accelerometer formed" should read -- wherein the accelerometer is formed --.

Signed and Sealed this

Thirteenth Day of September, 2005

JON W. DUDAS
*Director of the United States Patent and Trademark Office*